April 23, 1963 H. O. FUCHS 3,086,278
PEENING APPARATUS AND METHOD
Filed Aug. 25, 1960 3 Sheets-Sheet 1
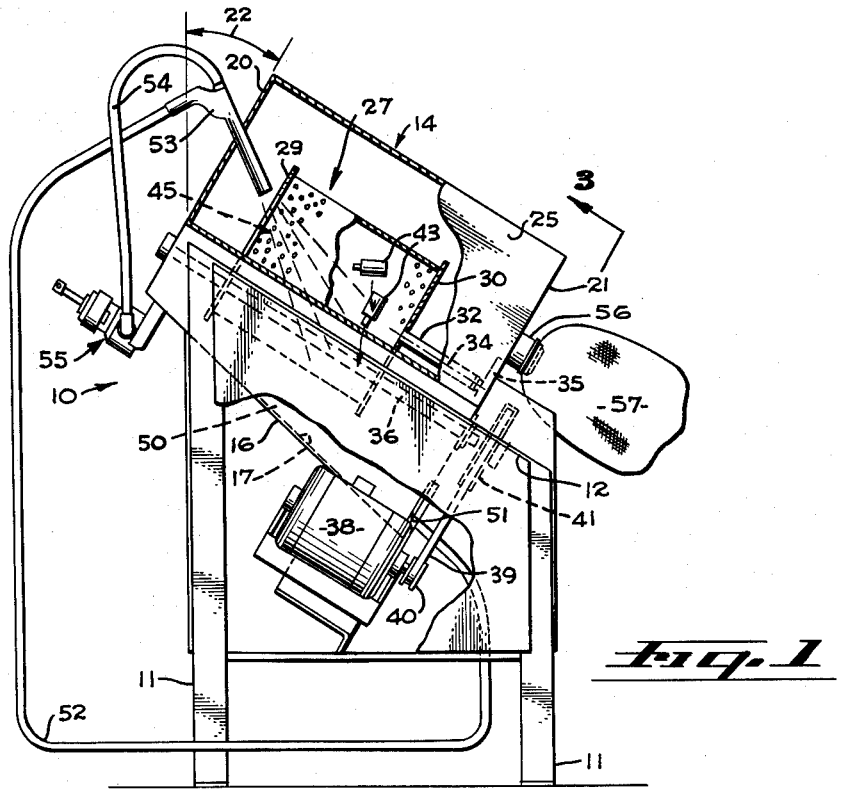
Fig. 1
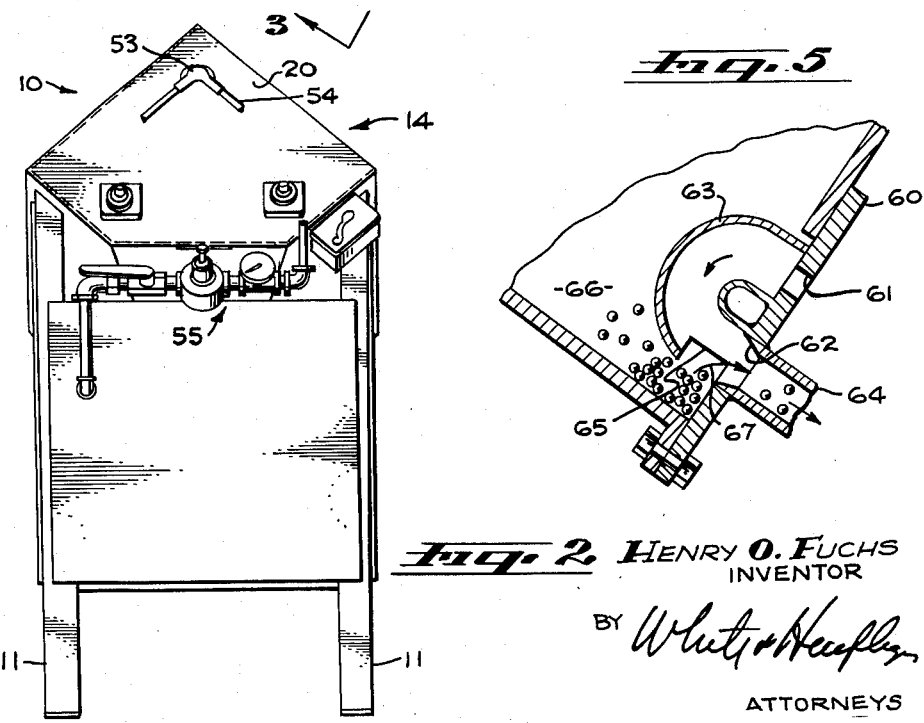
Fig. 2
Fig. 5
Henry O. Fuchs
INVENTOR
BY White & Haefliger
ATTORNEYS April 23, 1963   H. O. FUCHS   3,086,278
PEENING APPARATUS AND METHOD
Filed Aug. 25, 1960   3 Sheets-Sheet 2
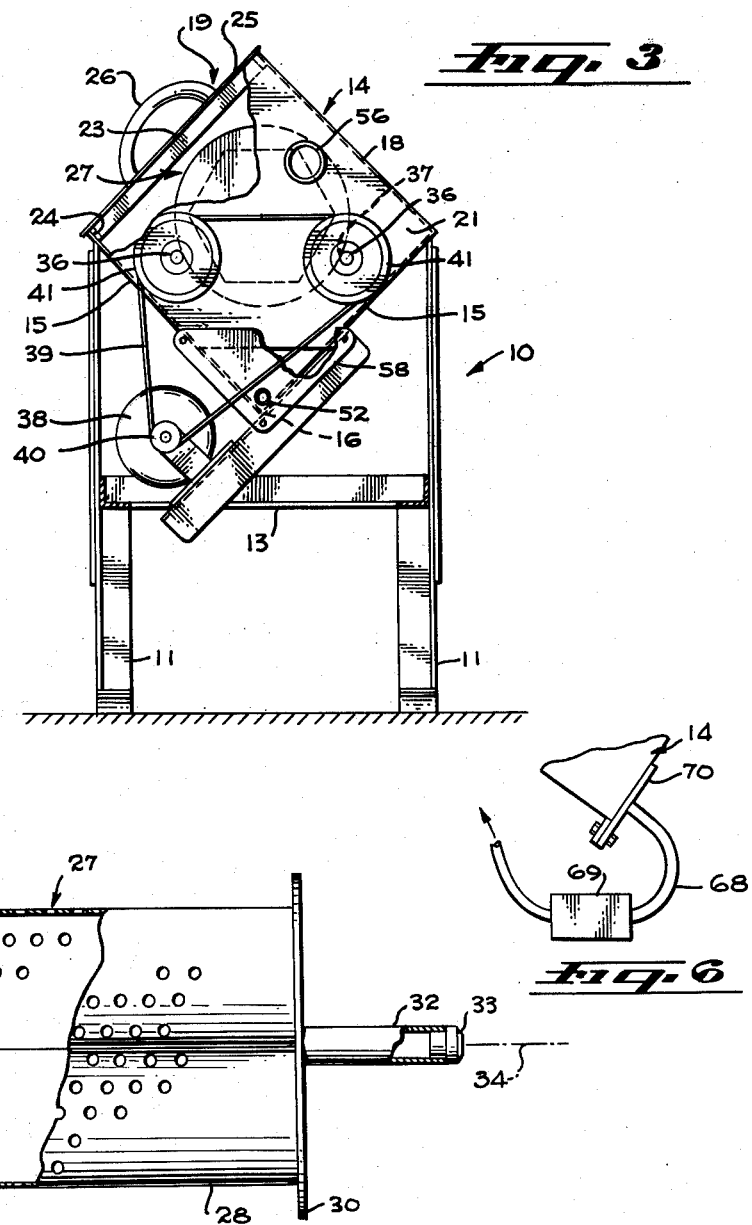
Henry O. Fuchs
INVENTOR
BY
ATTORNEYS April 23, 1963  H. O. FUCHS  3,086,278
PEENING APPARATUS AND METHOD
Filed Aug. 25, 1960  3 Sheets-Sheet 3
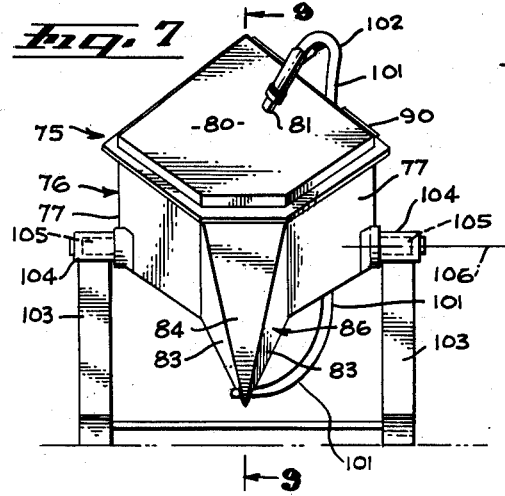
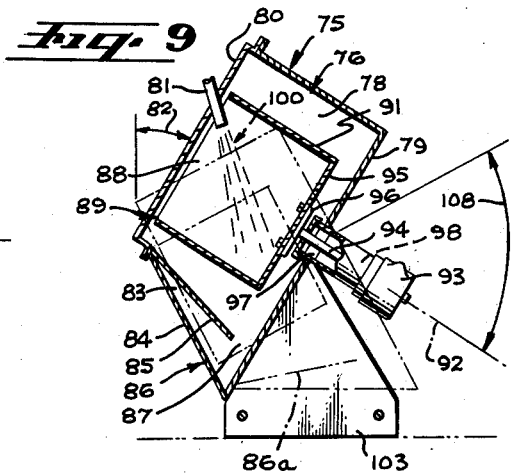
Henry O. Fuchs
INVENTOR
BY
ATTORNEYS

United States Patent Office 3,086,278
Patented Apr. 23, 1963

3,086,278
PEENING APPARATUS AND METHOD
Henry O. Fuchs, Altadena, Calif., assignor to Metal Improvement Equipment Company, Los Angeles, Calif., a corporation of California
Filed Aug. 25, 1960, Ser. No. 51,885
3 Claims. (Cl. 29—90)

This invention relates generally to the peening treatment of work pieces and more particularly concerns a novel apparatus and method for subjecting the work pieces to repeated impingement of peening shot particles as the work pieces are tumbled so as to expose all of the work surfaces to the desired treatment.

It is a major object of the invention to provide apparatus for carrying out the peening treatment, wherein the work is subjected to repeated elevation and droppage downwardly within a perforated rotary chamber, in response to rotation of the latter, the rotary chamber being removably received within an outer chamber in such manner that the rotary chamber is rotatable with its entrance remaining in alignment with a stream of peening shot particles jetted through the entrance for impingement against work pieces moving within the rotary work chamber. Furthermore, a rotary drive is provided for rotating the chamber about an axis inclined from horizontal so that the work tends to drop away from the entrance to the rotary chamber. Also, means is provided to support the outer chamber for movement between working and unloading positions, to facilitate loading and unloading of the rotary inner chamber.

In addition, in one form of the invention a thrust bearing is provided to transmit axial loading from the rotary chamber to the outer chamber, the thrust bearing and the rotary chamber entrance being at axially opposite ends of the rotary chamber in order not to interfere with jetting of shot particles into the rotary chamber. Furthermore, the thrust bearing and rotary drive are located so as not to block egress of shot particles outwardly through the perforations in the rotary chamber shell for gravitation within the outer chamber and ultimate discharge therefrom. Inclination from horizontal of the outer chamber and the rotary chamber axis of rotation promotes flow of shot particles in the outer chamber to the end that the particles do not build up or collect to undesirable extent within the outer chamber. Also, the parts are kept near the lower end of the rotary chamber.

Referring to the novel method of subjecting work to shot peening treatment according to the present invention, the work is traveled upwardly within an inner zone defined by the rotary chamber, and along a rotary path, the rotary travel speed of the work being controlled so that the work does not travel about a complete circular path but drops downwardly within the inner zone wherein a stream of shot peening particles is directed to impinge against the falling and tumbling work pieces. The spent shot particles are removed outwardly from the inner zone and the shot particles are confined to gravitate for removal and recirculation back to the inner zone as the work peening particles stream.

Among the advantages of the invention are the elimination of need for a seal between rotary and stationary chamber parts to prevent outward escape of shot particles from apparatus of this type, and the enhancing of shot peening efficiency through the ease of loading and unloading work pieces into and from the apparatus, and through the better control of shot circulation and flow through the apparatus as well as the more complete peening treatment of work pieces in a given peening time interval.

These and other objects of the invention, as well as the details of an illustrative embodiment, will be more fully understood from the following detailed description of the drawings, in which:

FIG. 1 is a side elevation, partly broken away, of the apparatus showing it in use;

FIG. 2 is an end elevation of the apparatus of FIG. 1;

FIG. 3 is an opposite end elevation, partly broken away, on line 3—3 of FIG. 1;

FIG. 4 is an enlarged section taken through the perforate rotary chamber or peening barrel;

FIG. 5 is an enlarged cross section taken through the shot collecting lower portion of a modified outer chamber;

FIG. 6 is a showing of the provision of a slurry chamber connected in series with the shot circulating system;

FIG. 7 is a vertical elevation showing another form of the apparatus;

FIG. 8 is a top plan view of the FIG. 7 apparatus;

FIG. 9 is a vertical section taken through the FIG. 7 apparatus on line 9—9 of FIG. 7;

FIG. 10 is a vertical elevation showing a further modified form of the apparatus;

FIG. 11 is a top plan view of the FIG. 10 apparatus; and,

FIG. 12 is a vertical elevation taken at right angles to FIG. 10 and on line 12—12 thereof.

In FIGS. 1 through 3 the apparatus 10 is shown generally to include a frame having four legs 11, and cross pieces 12 and 13, the parallel cross pieces 12 being considerably inclined from the horizontal. The frame supports an outer chamber, generally shown at 14, and comprised of downwardly convergent bottom plates 15, joined together by plate 16 to form a trough 17, and upwardly convergent plate 18 and closure 19. The chamber 14 is furthermore inclined from horizontal as best shown in FIG. 1, so that the chamber end plates 20 and 21, which are parallel, extend in planes inclined from the vertical as indicated by the angle 22.

The rectangular closure 19 includes a frame 23 adapted to interfit the opening 24 formed by the plates 15, 18, 20 and 21, and a closure plate 25 mounting handles 26 by means of which the closure may be manually removed from the opening 24. Under such circumstances a rotary inner chamber generally indicated at 27 is insertible or receivable through the opening 24 into the outer chamber 14, and conversely the rotary inner chamber is readily removable from the outer chamber.

Referring now to FIG. 4, the rotary inner chamber typically comprises a perforated hexagonal shell 28 and end plates 29 and 30 connected to the shell, the former plate forming an opening 31 through which work pieces are insertible into and removable from the chamber 27. Integral with the chamber at the end thereof, opposite the entrance 31, is a rotary thrust bearing shown in the form of an axial projection or shaft 32 having a terminal end bearing 33 on the axis of rotation 34 of the chamber 27. Shaft 32 also serves as a handle for lifting the chamber 27 out of the outer chamber 14.

When the rotary chamber 27 is placed within the outer chamber 14, it is supported therein for rotation about its axis 34, with the terminal end 33 of the thrust bearing engaging a bearing plate 35 mounted by the outer chamber 14 as best shown in FIG. 1. Accordingly, the thrust bearing 32 transmits thrust loading from the rotary chamber 27 to the outer chamber 14 in such manner that it does not interfere with outward escape of peening shot particles from the rotary chamber 27, as will be described.

The rotary chamber 27 is supported for rotation within the outer chamber 14 by a pair of rotors in the form of rollers 36, typically rubber covered for frictional drive purposes, these rollers being transversely spaced apart and having parallel axes of rotation which are inclined from horizontal as indicated in FIG. 1. The rollers 36 have considerably reduced diameters as compared with the equal diameters of the circular end plates 29 and 30 of the inner chamber, which end plates comprise driven rotors the peripheries of which are engaged by the drive rollers 36 at the locations 37.

Drive is transmitted to the rollers 36 by means of a motor 38 mounted by the apparatus frame, a belt 39 driven off a motor driven pully 40, and a pair of sheaves 41 mounted on extensions of the rollers 36 projecting outside the outer chamber 14. In this connection it will be understood that the rollers 36 are supported by suitable bearings carried by the end plates 20 and 21 of the outer chamber.

During such rotation of the inner chamber 27, and after the closure 19 has been shut so as to completely confine the chamber 27 within the outer chamber 14, an air entrained stream of peening shot particles is directed through the entrance 31 to the inner chamber 27 for impingement against the work pieces, the stream of shot being generally indicated by the broken lines 45 in FIG. 1. The rotary speed of the chamber 27 is such that the work pieces 43 are subjected to repeated elevation and droppage downwardly within the chamber 27 in response to rotation of the latter. Thus, the work pieces are traveled relatively upwardly within the work zone formed by the inner chamber 27 and along a rotary path indicated by the plane 46. The rotary speed of the chamber 27 is not so great as to travel the work pieces about a complete circular rotary path, but is sufficient to elevate them to a point where they slide away from engagement with the chamber inner walls and slide downwardly within the chamber 27, and tumble so as to present different surfaces thereof to the impinging shot stream, this process being continued as long as the apparatus is operated. Accordingly, a very complete peening treatment is imparted to the work pieces.

Moreover, the work pieces do not fall out of the chamber 27, since they fall away from the open entrance 31 thereof, as accommodated by the tilting from horizontal of the chamber axis of rotation 34.

It will be noted that the drive mechanism including the rollers 36, and the thrust bearing 32 are located so as not to restrict or block outward escape of shot particles from the inner chamber, the latter being completely surrounded by open space into which the shot particles are free to escape, thereby promoting such escape. On the other hand, the outer chamber 14 completely confines the outwardly escaping shot particles, and its inclination promotes downward gravitation of the latter within the outer zone 50 formed by the outer chamber 14. For example, the trough 17 of which the sides are formed by the downward converging bottom plates 15 conducts the spent shot particles downwardly toward an outlet 51, from which the shot is continuously drawn through a conduit 52 during operation of the apparatus. Such withdrawn shot is then recirculated to the peening nozzle 53 to which entraining air is supplied through air line 54. The amount of air flow is controlled as by a regulator 55 shown in FIG. 2 so as to draw the shot through the conduit 52 as well as to entrain it for delivery into the peening chamber.

After the peening cycle has been completed, the closure 19 may be quickly removed and the inner chamber 27 quickly lifted out from the outer chamber 14, following which the treated work pieces may be dumped from the chamber 27 through the entrance 31. During operation of the apparatus described, air is allowed to escape from the outer chamber 14 through an outlet 56, having a dust catcher 57 attached for filtering dust particles from the discharging air stream. At appropriate intervals a removable cover plate 58 is detached from the end plate 21 to facilitate cleaning of the lower interior of the outer chamber 14.

In FIG. 5 the modified closure plate 60 has an upper air inlet opening 61 and a lower shot outlet opening 62. A U-shaped pipe 63 is joined to the plate 60 at the inside thereof with opposite pipe ends communicating with the two openings, and a discharge pipe 64 is joined to the plate 60 in communication with the lower opening 62, as shown.

The pipe 63 contains a downwardly opening inlet 65 or slot adjacent outlet opening 62, which functions to pass shot particles collecting at 66 into the air stream flowing through the pipe 63, as indicated by the arrow 67. Air is drawn into the pipe 63 through opening 61, picks up shot at 67 and then passes, mixed with shot, through pipe 64 and a bore to the peening gun 53 seen in FIG. 1.

FIG. 6 shows a wet slurry drain pipe 68 connected in series with a wet slurry container 69, from which a slurry of wet peening shot is drawn to the peening gun. The pipe 68 is connected to another plate 70 attached to the outer chamber 14 in place of plates 58 or 60.

Referring now to FIGS. 7 through 9, the modified apparatus 75 is shown to include and outer chamber 76 having bottom plates 77 which are downwardly convergent in the working position of the chamber shown in solid lines. The chamber 76 also includes upwardly convergent top plates 78, and end plate 79 and a front closure 80 which mounts the peening nozzle 81. As best shown in FIG. 9, the outer chamber 76 is inclined in working position so that the end plate 79 and front closure 80, which are parallel, extend in planes inclined from vertical, as indicated by the angle 82. Extensions 83 and 84 of the bottom plates 77, the lower extent of end plate 79 and a downwardly sloping inner baffle 85 form a shot receptacle 86 for trapping shot particles gravitating through the entrance 87 to the receptacle.

The rectangular removable closure 80 is generally similar to that described and shown previously at 19 excepting that it closely overlies the fully open entrance 88 to the rotary inner chamber 89 in the working position of these elements shown in full lines. Thus, upon removal of the closure from directly over the upper interior of the chamber, facilitated by hinge connecting the closure at 90 to the plate 78, work pieces may be loaded directly into the rotary inner chamber 89.

The latter chamber typically comprises a perforated cylindrical shell 91 having an axis of rotation 92 which extends downwardly relative to horizontal in the working position. Means is provided for rotating the chamber 89 about axis 92, and typically includes a drive unit 93 for rotating a shaft 94, which is connected to the interior end plate 95 of chamber 89 through a plate 96. The shaft is bearing supported at 97, the bearings and shaft being housed at 98 for protection from shot particles.

During rotation of the inner chamber 89, and after the closure 80 has been completely shut to confine the chamber 89 within the outer chamber 76, an air entrained stream of shot particles is directed through the end entrance 88 to the rotating inner chamber for impingement against the sliding and tumbling work pieces, the shot stream being indicated at 100, and the peening operation being the same as previously described in connection with FIG. 1. In this regard, the shot particles escaping from within the rotary inner chamber are caused to gravitate downwardly and are concentrated to enter the receptacle 86 through entrance 87 thereof. During operation, the shot entering the receptacle 86 is returned to the peening nozzle 81 via line 101, and compressed air is suitably supplied to the nozzle through line 102.

FIGS. 7–9 also show means supporting the outer chamber for bodily movement between full line working position, in which the nozzle 81 is oriented to direct the stream of shot particles downwardly relative to horizontal, and broken line unloading position, in which the rotary chamber 89 is readily accessible for removal of work therefrom. One form of such means comprises a pair of uprights 103 supporting bearings 104 for trunnions 105 carried by the outer chamber 76, the trunnions and bearings comprising a pivot means and defining an axis 106 extending horizontally and therefore at an angle to axis 92.

Accordingly, after completion of the working cycle in which the chamber 76 occupies the full line position shown in FIG. 9, the closure 80 may be swung open or removed from direct overlying relation to the rotary chamber entrance 88, and the outer chamber may then be swung through an angle 108 into broken line unloading position shown in FIG. 9, in which the entrance 88 overlies the open end of the outer chamber. Therefore, treated work pieces may be unloaded or dumped directly outwardly onto the floor or a pallet. At the same time, peening shot retained in receptacle 86 cannot escape therefrom through the open outer chamber since the baffle 85 is seen to occupy the broken line position 86a in which it blocks such shot egress.

Referring now to FIGS. 10–12, the modified apparatus 110 is shown to include an outer chamber 111, which has the same general construction and operation as the chamber 14 described in connection with FIGS. 1–3, so that the same numbers are applicable to the component parts of chamber 111. Also, the rotary inner chamber shown in broken lines at 112 has the same construction and operation as the rotary inner chamber 27 in FIGS. 1–3, the same part numbers being applicable.

The principal differences embodied in FIGS. 10–12 have to do with the means supporting the outer chamber 111 for bodily movement between full line working position corresponding to FIGS. 1–2, and broken line loading and unloading position, in which the rotary chamber 112 is readily accessible. In this regard, the support means shown for accomplishing this function typically comprises a frame structure 113 including a pair of uprights 114 and 115 carrying bearings 116 and 117 at higher and lower elevation respectively, for trunnions 118 and 119 carried by the outer chamber 111. These bearings and trunnions comprise a pivot means and define an axis 120 extending at a downward angle relative to horizontal, and offset in such relation to the axis of rotation 34 of the rotary inner chamber that the outer chamber may be swung from full line working position to broken line loading and unloading position. Such rotary movement is indicated by the arrow 121 and will be understood to carry the plates 15 into positions 15a, and to carry the axis 34 of the chamber 112 into horizontal position, enabling roll-out removal of the rotary chamber 112 onto a table 122 without requiring lifting of the work-loaded rotary chamber. The position of the closure 19 after such rotation to unloading position, and before removal of the closure, is indicated at 19a. The positions of the lower horizontal edge of plate 20 are shown before and after rotation at 130 and 130a respectively.

In FIG. 11 a plate 125 can be seen through the opening 24, the plate functioning to support the discs 29 and 30 of the inner chamber 112 when the latter is installed within the outer chamber. In unloading position of the latter, the plate 125 extends horizontally toward the lower edge 126 of the opening 24 facilitating roll-out removal of the chamber 112 onto table 122.

Of course, means such as support rails for discs 29 and 30 may be provided in substitution for plate 125, the function being the same.

While the invention has been described in connection with peening treatment of work pieces, it will be understood that the apparatus is also usable for other types of work treatment wherein a stream of particulate material is directed against work, as for example blast cleaning.

I claim:

1. Work treatment apparatus, comprising a perforate rotary shell adapted to receive work pieces for elevation and droppage therein in response to rotation thereof, a pair of substantially parallel rotary rollers which are inclined from horizontal, rotary flange means peripherally supported by said rollers to be rotated by at least one of said rollers, said flange means transmitting a portion of shell imposed loading so as to freely support said shell for rotation in spaced relation to said rollers, means for rotating at least one of said rollers, said shell having an entrance away from which said work pieces tend to drop, conduit means for directing a stream of particles through said entrance to impinge against the work pieces dropping in said shell, an outer chamber within which said shell is removably received in openly spaced relation to the chamber walls and for confining particles escaping outwardly through the perforate shell to gravitate outside said shell but within the outer chamber, and a projection extending between the shell and a lower portion of the chamber for transmitting the remainder of shell imposed loading and freely supporting the shell in predetermined spaced relation to the chamber for free upward withdrawal away from said rollers, said means including a pair of spaced apart flanges coaxial with said projection and integral with said shell, said projection also being integral with said shell to provide a handle therefor.

2. The invention as defined in claim 1 including a pipe in the lower portion of said outer chamber having an upstream air inlet and a downstream particle inlet, said pipe communicating with said conduit means for conveying a stream of air entrained particles thereto.

3. The invention as defined in claim 1 including a container for wet particles having an inlet in communication with the lower portion of said outer chamber and an outlet in communication with said conduit means.

References Cited in the file of this patent

UNITED STATES PATENTS

| | | |
|---|---|---|
| 1,116,505 | Sly | Nov. 10, 1914 |
| 1,462,295 | Moore | July 17, 1923 |
| 1,491,663 | Billings | Apr. 22, 1924 |
| 1,544,513 | Wild | June 30, 1925 |
| 1,581,045 | Fatscher | Apr. 13, 1926 |
| 1,656,238 | Ruemelin | Jan. 17, 1928 |
| 1,770,013 | Rich | July 8, 1930 |
| 2,116,160 | Rosenberger | May 3, 1938 |
| 2,351,453 | Pearl | June 13, 1944 |
| 3,007,285 | Bigelow | Nov. 7, 1961 |
| 3,008,274 | Welter | Nov. 14, 1961 |